US006923635B2

(12) United States Patent
Burgess

(10) Patent No.: US 6,923,635 B2
(45) Date of Patent: Aug. 2, 2005

(54) ADJUSTABLE FRAME SUPPORT FOR PRE FORMED MOLD

(75) Inventor: Jeffrey S. Burgess, Fertile, MN (US)

(73) Assignee: VEC Industries, L.L.C., Minneapolis, MN (US)

( * ) Notice: Subject to any disclaimer, the term of this patent is extended or adjusted under 35 U.S.C. 154(b) by 10 days.

(21) Appl. No.: 10/317,347

(22) Filed: Dec. 12, 2002

(65) Prior Publication Data

US 2004/0115303 A1 Jun. 17, 2004

(51) Int. Cl.⁷ ............................................. B29C 45/64
(52) U.S. Cl. ...................... 425/186; 425/190; 425/542; 249/120
(58) Field of Search ................................ 425/186, 190, 425/542; 249/120, 160, 190

(56) References Cited

U.S. PATENT DOCUMENTS

| 4,731,144 A | | 3/1988 | Kommineni et al. |
| 5,151,277 A | * | 9/1992 | Bernardon et al. ......... 425/112 |
| 5,192,560 A | | 3/1993 | Umetsu et al. |
| 5,513,972 A | * | 5/1996 | Schroeder et al. .......... 425/175 |
| 5,546,313 A | * | 8/1996 | Masters ....................... 700/98 |
| 5,846,464 A | | 12/1998 | Hoffman |
| 6,298,896 B1 | | 10/2001 | Sherrill et al. |
| 6,354,561 B1 | | 3/2002 | Fahrion |

* cited by examiner

Primary Examiner—Donald Heckenberg
(74) Attorney, Agent, or Firm—Robert E. Kleve

(57) ABSTRACT

The invention comprises an adjustable frame for a the concave mold of a pre formed two piece mold having a convex mold and a concave mold adapted to be closed to mold a product. The adjustable frame has surrounding sides and a bottom with an open top to removably receive and support the preformed concave mold of the two piece mold, said surrounding sides and bottom with the surrounding sides have a plurality of elongated pins extending inward toward one another, and with the bottom having a plurality of pins extending upward to thereby support the surrounding sides and bottom of a concave mold, with the pins being adjustable along their length inward toward one another and upward to enable the same frame to support different concave molds of different shapes and sizes therein in connection with the convex molds to form products of different sizes and shapes.

3 Claims, 3 Drawing Sheets

ADJUSTABLE FRAME SUPPORT FOR PRE FORMED MOLD

This invention relates to light weight molds or dies and to the structure for supporting the same, more particularly, the invention relates to supports for premolded or preformed molds or skins.

It is an object of the invention to provide a novel adjustable support or reinforcement for lightweight, premolded concave skin type mold of such materials, as fiberglass, when using the mold or skin to produce a product with the adjustable support or reinforcement to prevent distortion of the pre formed or premolded mold or skin with the support having a frame with adjustable banks of pins about the four sides and extending upward from the bottom of the frame with can be adjusted by a screw type movement of the pins toward the skin type mold to engage the exterior of the concave mold and support the same which frame can be used to support another mold of a similar size but of a different configuration within the frame by the adjustment of the pins to conform to that configuration.

It is a further object of the invention to provide a novel adjustable support for a fiberglass skin type concave pre formed mold by having adjustable pins spaced from one another in four vertical banks of pins about the four sides of the frame extending horizontally toward one another to support the sides of the mold to prevent distortion of the mold or skin while molding products under injection molding and which pins are adjustable toward and away from one another to enable the pins to be adjusted to support and reinforce another preformed mold or skin of a different configuration.

It is another object of the invention to provide a novel adjustable support for pre molded molds or skins so that pre molded or pre shaped molds or skins can quickly and easily supported and reinforced against distortion while molding objects by injection molding with the molds, and the same adjustable support can be quickly adjusted to support a different size pre molded molds or skins and/or a different configurations for molding of objects of different size or configurations.

It is another object of the invention to provide a novel adjustable support for so that different size and shapes of pre molded molds or skins may be supported, when used for molding, in the same adjustable support in connection with injection molding of a product.

It is another object of the invention to provide an adjustable means in a frame support for at least one of a two piece closed pre shaped for injection molding an object, and so as to enable the same frame support to be adjusted to be used to bolster or reinforce other pre shaped or pre formed molds or skins of different shapes and sizes in that frame and prevent their distortion when molding other objects from these other two piece moldings.

Further objects and advantages of the invention will become apparent as the description proceeds and when taken in conjunction with the accompanying drawings wherein.

BRIEF DESCRIPTION OF PREFERRED EMBODIMENT

Figure 1:
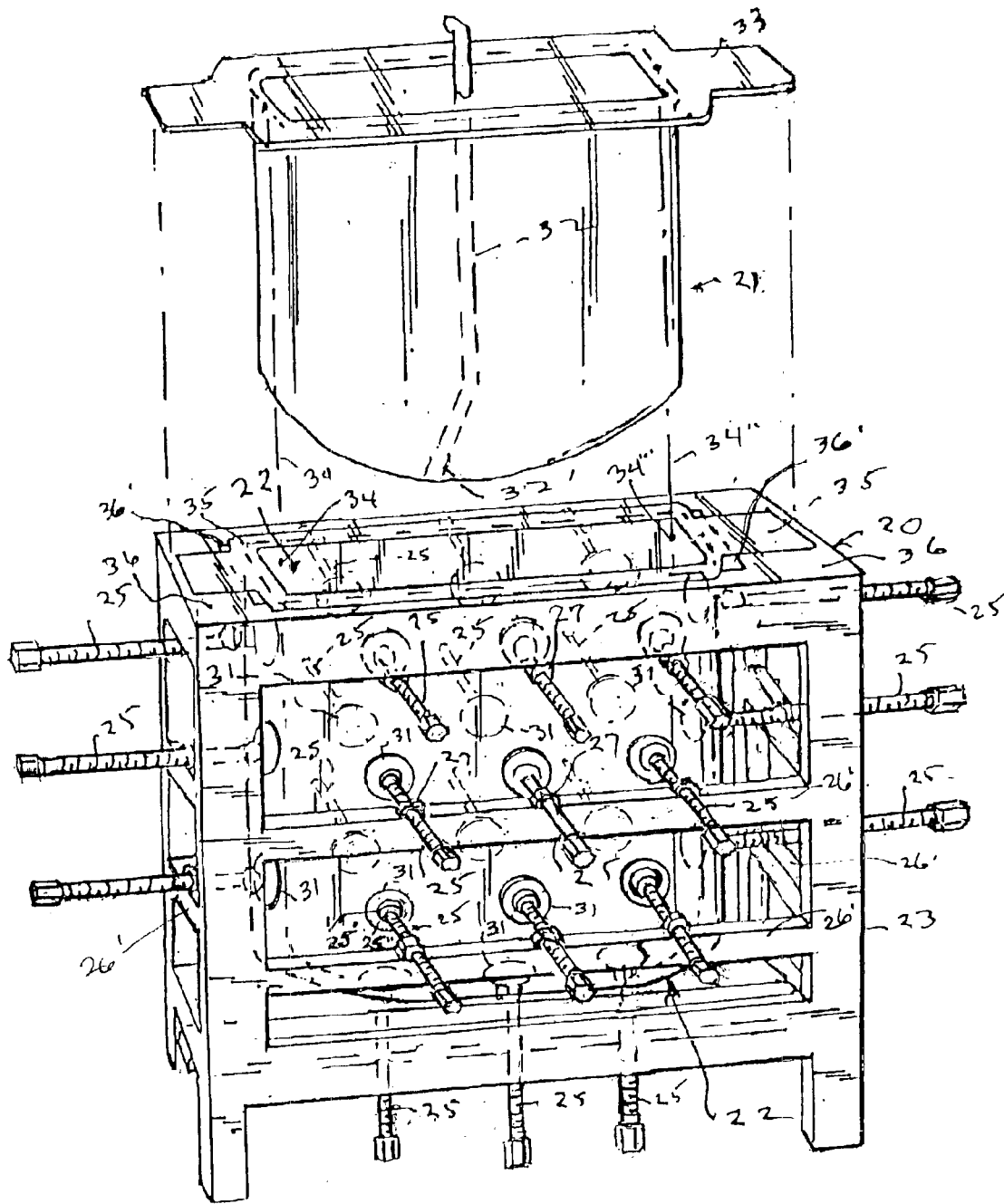
FIG. 1 is a perspective view of the adjustable frame for the concave or female skin type mold with the convex or male skin type mold about to be installed on the frame for operatively using the two molds to mold a plastic molded or composite product.
Figure 2:
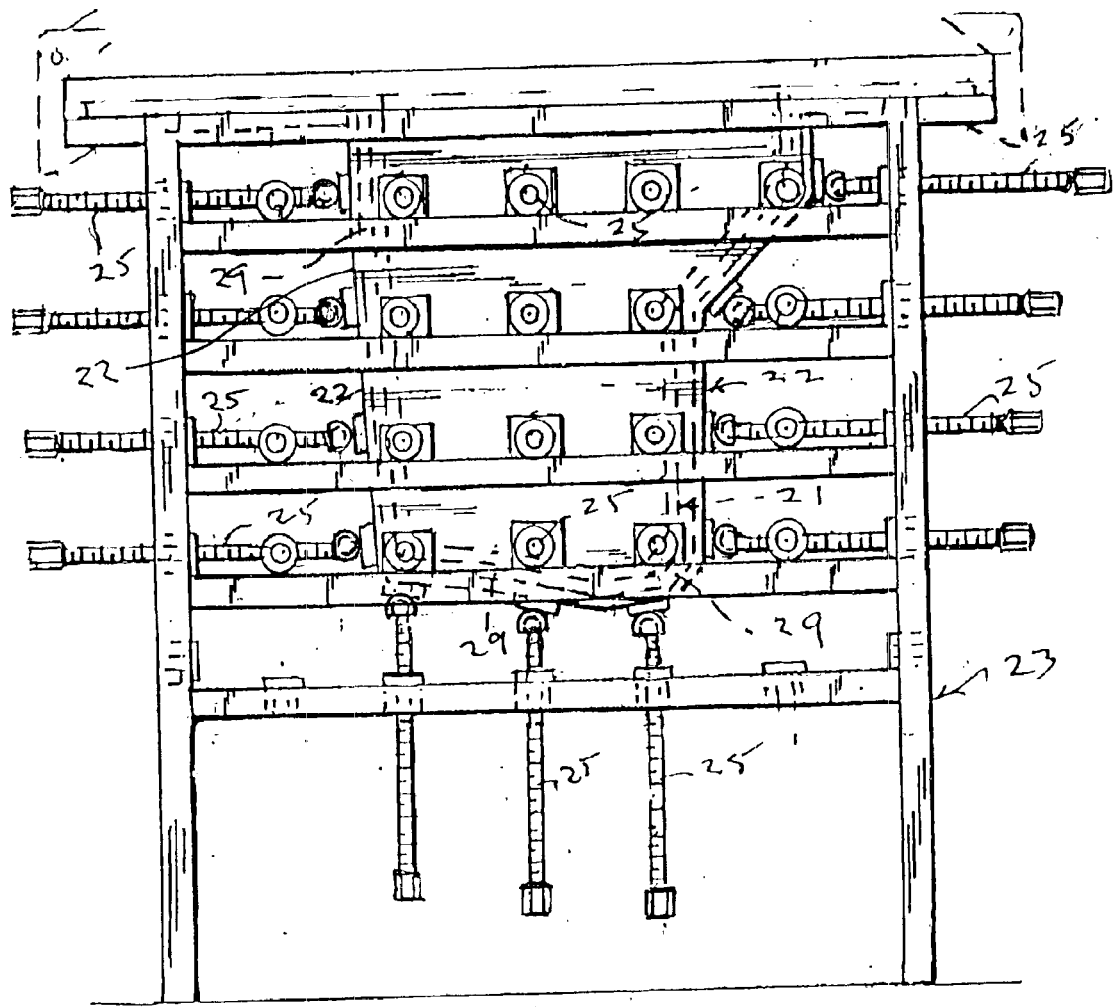
FIG. 2 is a side view of the concave mold and the adjustable support or frame for the mold.
Figure 3:
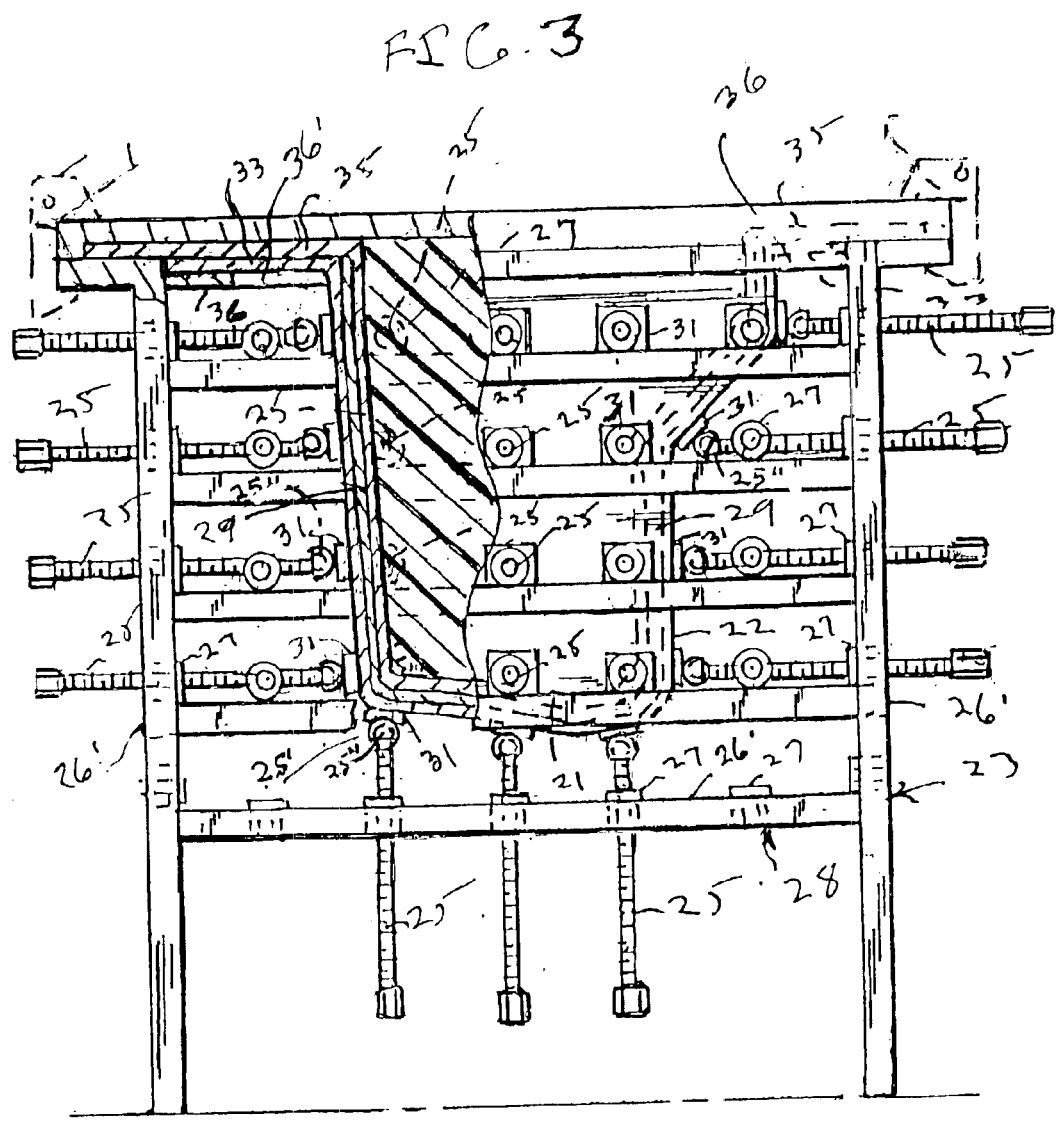
FIG. 3 is a side cutaway view of the adjustable frame for the concave skin type mold and the convex mold mounted thereto with portions cutaway to reveal the interior construction.
Figure 4:
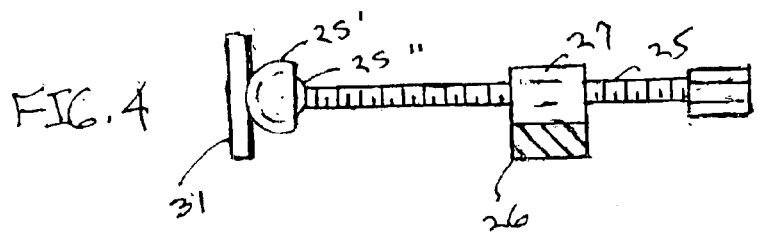
FIG. 4 is an enlarged view of one of the substantially uniform adjustment pins with the ball and socket connections to the engagement plate.

Referring more particularly to the drawings, in FIG. 1, the adjustable frame invention 20. The invention 20 is a two piece fiberglass mold or composite material formed of a convex fiberglass or composite mold 21 and a concave fiberglass or composite mold 22. The concave mold 22 is supported upon an adjustable frame support 23 and the adjustable frame support is illustrated in FIGS. 1–3. The frame support 23 has four side wall banks 24, 24',24", 24"' with adjustable horizontal screw type pins 25 which are spaced from one another along a plurality of spaced horizontal 26 bars forming the four sides of the frame 23. A plurality of threaded sockets 27 are fixed to the bars 26 at spaced intervals along the five horizontal bars 26 of each of the four sides of the frame 23; and the pins 25 are threaded into the threaded sockets 27.

Each threaded pin 25 has a plate 31. The plate has a socket 25' fixed to the rear of the plate and the pin has a ball 25' fixed to the forward end of the pin and mounted within the socket to provide a ball and socket connection between the plate and the forward end of the pin so that the plate may adjust to angular positions when the plate of each pin is engaged against the back of the mold 22 to support the concave mold.

A bottom wall 28 is also formed of spaced horizontal bars 26' and also has sockets 27 fixed to the bars 26 at spaced intervals along the bars 26'. These bars 26' and the wall formed thereby are mounted beneath the concave mold 22 and the sockets extend vertically upward in their threaded axes for receiving additional vertical pins 25 positioned vertically on the frame. The vertical pins 25 can be threaded upward and downward to adjust their plates 31 toward and away from the mold so as to enable the plates to adjustably engage against and support the bottom of the preformed fiberglass mold 22. The four side walls have their pins 25, which pins can threaded adjustably along their horizontal axes to cause their plates at their forward ends to adjustably and removably engage and support the four sides of the concave mold.

The concave mold 21 is a one piece skin or mold or composite material with an open top an with a integral horizontal top flange 35 integral to and surrounding the top edge of the mold and the flange is adapted to rest on the top outer edge surfaces 36 of the adjustable frame. The convex mold or skin 22 is also a one piece skin or mold of fiberglass or other composite material with a horizontal top flange 33 integral to and surrounding the top edge of the mold.

The convex mold 21, when mounted in place in the concave mold and being smaller than the concave mold 22 throughout its width and height up to its top flange 33 and complementing the shape of the mold 22 in spaced relation, provides a continuous space 29 between the mold 22 and the mold 21 through its width and height up to its flanges to provide a space for a molded product to be produced between the two skins that conforms to the shape of the two skins.

Vertical line 34, shown in FIG. 1, extends along the exterior surface of the convex mold 21 to the point 34' and from there extends downward into mold 22 to show the space 29 between the outside of mold 22 and inside of mold 21 at the one end of the molds. The vertical line 34" similarly extends downward from the exterior surface of the convex mold on other side of the mold to the point 34''' into mold 22 to show the space between the outside of mold or skin 22 and the inside of mold or skin 21 at the other end of the molds or skins.

It is intended that the support invention 20 be used in connection with two piece injection molding, primarily wherein, the plastic or composite material forming the product is injected under pressure into the closed area 29 between the molds to form the plastic product 29' shown therein.

The convex frame 21 is a one piece fiberglass skin or mold and for strength and may be filled with plastic foam or other suitable reinforcing material 21', although it is contemplated that an internal frame may be provided with adjustable pins would be adjustable inward and outer against the inside of the convex frame to reinforce the convex frame.

Before the mold 22 is placed upon the pins 25 of the frame 23, as shown; it is possible to apply a gel coating to the interior surface of the mold 22. Then the mold will be placed upon the pins 25 and the pins will be adjusted by threading them upward or downward or inward or outward to firmly engage exterior surfaces of the mold to keep the mold in its proper place during the injection molding process and reinforce the mold and keep or prevent the mold from expanding out of shape when the plastic is injected to form the product.

Once the concave mold 22 is in proper place in frame 23, it is customary before lowering the mold 21 into place, to insert reinforcing material such as a fiberglass web sheet or composite sheet or core material into the interior surface of the mold 22. Whereupon, the mold 21, which is on a separate frame, is lowered into the cavity of mold 22 to mate in spaced relation with the mold 22 and is secured to the top of the frame by conventional locking means (not shown).

A crane will have conventional means, not shown, which can be used to hold and carry and raise and lower the convex fiberglass one piece mold 21 and is removably mounted in its operative position over the first frame 23. For the molding process, the convex molding 21 introduced vertically downward into the frame mold 22, by the conventional lowering mechanism (not shown) to their operative position as shown in the FIG. 3, until the flange 33 of the convex skin or mold rests upon the flange 35 of the concave skin or mold and conventional sealing ribs on one of the flanges will seal the flanges in fluid tight relation.

When the convex mold 22 comes to rest upon mold 21, the flange 33 of the mold 21 will rest flush upon the flange 35 of mold 22 with the suitable seal there between is done in a conventional manner. While at the same time, conventional locking means will lock the flanges together for the molding process on the peripheral top flange 36 of the frame 23, so that the introduction of the fluid plastic may begin to place the fluid plastic in the space 29 there between the skins.

Thereafter, the fluid plastic or resin, through a fluid line 32 which line is fixed in the reinforcing material of mold 21 and extends from the top of the mold downward in the mold 21 with an exit 32' at the bottom of the mold or skin 21 into space 29, is injected into the space 29. The fluid plastic intermingles with the fiberglass web or reinforcing fiber and hardens to form solid relatively rigid product; while the gel, applied to the mold interior, adheres to the exterior of the molded product to provide a finish to the one face of the product. Conventional venting is provided at the top to allow the space 29 to fill substantially to the top of the frame.

Because the adjustable frame 23 supports the mold or skin 22 by adjustable pins 25, and the mold 22 extends down into the frame 23 through the open top 36' of the frame 23 with the projecting outer top flange 35 of the mold 22 resting on the outer top peripheral flanges 36 of the frame; the mold 22 can be lifted out of and removed from the frame 23 through its open top 36' area between the peripheral flanges 36 of the top of the frame and replaced by another mold or skin of the same shape and size or another mold or skin that may have a different conformation.

If it is smaller than the frame, so that the pins can be screwed inward or outward, where appropriate, to engage the exterior of the new mold or skin by adjusting to the new conformation of the new cavity mold 22, the same frame may be used with another and different skin or mold.

Where the new mold is smaller than others, the pins can be adjusted accordingly to support the smaller mold. Unless, of course, the mold is so disproportionately smaller than the frame that the pins are too large for effective use and it would more desirable to make a smaller frame for in keeping with the size of the smaller mold.

Thus, novel adjustable frame has been provided which can be used for bolstering, and reinforcing pre formed molds of different shapes and conformation, whereas in the past it has been customary to build a separate frame for each preformed mold of one shape and size.

The rectangular frame with adjustable pins along the bottom and along the four surrounding sides enables varying different size concave molds to be supported in connection with the two piece injection molding. Also, by having a frame with a plurality of mainly adjustable vertical pins, premolded skins or dies forming the bottoms of broad wide object may be quickly and easily removed from the frame by simply sliding the skin upward out of the open top of the frame.

Since the pre molded skins are being used in connection with a plastic injection process the pressure under which the plastic is injected is rather high and unless the skins are reinforced the high pressure might cause distortion of the shape of the skin, or mold. By using the frame with the adjustable pins to reinforce the skin, it enables the pins to be adjusted to use the same frame to support and reinforce different shapes and sizes of pre molded or pre shaped skins in the molding process.

It is contemplated that the pins may be power operated rather than manually turned by wrenches by vising hydraulic cylinders or air cylinders to power the movement, or by a solenoid operation for each pin or by other power operations for the adjusting movement of the pins.

It is desirable that several identical concave molds 21 be used when manufacturing a high volume of products, and that the molds being easily and quickly removed from the frame as they are in the invention, since it takes time for the coat to be applied to the mold and for the coat to cure sufficiently, before the molded product can be produced in the two piece mold by injection of the plastic onto the reinforcing fiber, and the gel coating can then transfer onto the molded product. Thus, by applying the coat to another mold 21 before the previous molding process is complete, time is saved in the applying of the coat and allowing it to cure, in the overall process of the manufacturing process of producing multiple products from the same, size and configured mold.

The size and shape of the adjustable frame 23 may vary; such as the frame shown in the FIG. 1 has only three adjustable pins in a wall, while the frame in the other Figures has five mounting sockets in a wall for the pins.

The outer length and width of the horizontal flanges of the skins may be remain constant for a certain size adjustable frame so as to rest upon the horizontal peripheral surfaces 36 surrounding the open top of the frame, while the inner length and width of the horizontal flanges may vary depending upon the size of the molding, and while the size of the molding for the skin may vary in length and width and the pins may be adjusted accordingly.

It will be obvious that various changes and departures may be made to the invention without departing from the spirit and scope thereof, and accordingly, it is not intended that the invention be limited to that specifically described or as illustrated in the drawings, but only as set forth in the appended claims wherein:,

What is claimed is:

1. In a two piece preformed injection mold for molding plastic products comprising a preformed concave mold, and a preformed convex mold adapted to be closed together in closely spaced relation for molding a plastic product in the apace therebetween, a reinforcing frame for supporting and reinforcing one of said two piece molds, said frame having surrounding sides, a bottom, adjustable pins extending toward one another horizontally from the surrounding sides, adjustable pins extending upward from the bottom, said pins being adjustable to support and reinforce said one mold from the bottom and from the surrounding sides, with said one mold being removably mounted to said pins from the top, said pins being adjustable to different sizes and conformations whereby said one mold may be removed from the frame, and a different one piece preformed mold with different dimensions may be reintroduced from the top of the frame to enable the frame to serve as the reinforcing support for one piece of a new two piece injection mold.

2. An adjustable frame for a concave mold of a preformed two piece mold having a preformed convex mold and a concave preformed mold adapted to be closed together to mold a product, said adjustable frame having surrounding sides and a bottom with an open top to receive and support the concave preformed mold of the two piece mold, said surrounding sides have a plurality of adjustable pins extending inward toward one another and said bottom having a plurality of pins extending upward toward the top, said pins in said surrounding sides being adjustable toward and away from one another and said pins in said bottom being adjustable upward and downward to support different concave molds of different shapes and sizes therein in connection with the convex mold to form products of different sizes and shapes.

3. An adjustable frame for a concave mold of a preformed two piece mold having a preformed convex mold and a concave preformed mold adapted to be closed together to mold a product, said adjustable frame having surrounding sides and a bottom with an open top to receive and support the concave preformed mold of the two piece mold, said surrounding sides having a plurality of adjustable pins extending inward toward one another and said bottom having a plurality of pins extending upward toward the top, said pins in said surrounding sides being adjustable toward and away from one another and said pins in said bottom being adjustable upward and downward to support different concave molds of different shapes and sizes therein in connection with the convex mold to form products of different sizes and shapes, said pins at their inner ends each having a plate for flush contact with the mold with a ball and socket connection between the pin and the plate for angular adjustment in the contact with the mold.

* * * * *